3,314,749
PROCESS FOR PRODUCING FLUORIDE FROM AN ALUMINUM ALCOHOLATE
Kenichi Fukui, Sakyo-ku, Kyoto, and Hisao Kitano, Abeno-ku, Osaka, Japan, assignors to Mitsui & Co., Ltd., Tokyo, Japan
No Drawing. Filed Sept. 4, 1963, Ser. No. 306,629
Claims priority, application Japan, Oct. 27, 1962, 37/47,934; Nov. 17, 1962, 37/51,607
10 Claims. (Cl. 23—88)

This invention relates to a new process for producing aluminum fluoride at low cost and in great quantities which is important in the metal industry and the inorganic chemical industry, and it is an object of this invention to produce aluminum fluoride of high purity in relation to the petroleum chemical industry. Aluminum fluoride is especially important in the aluminum metal industry and various processes have been known and practised in this connection, such as, for instance, the process of neutralizing aluminum hydroxide and aluminum oxide with hydrofluoric acid, the process of neutralizing with fluoboric acid or fluosilicic acid in place of hydrofluoric acid, the process of treating aluminum metal with hydrofluoric acid, the process of reacting aluminum sulfate with calcium fluoride and so forth.

The inventors have discovered that aluminum fluoride can be produced much more advantageously than in the conventional processes in relation to the petro-chemical industry.

According to the new process of this invention, aluminum alcoholate having at least one alkoxy group containing 4 to 20 carbon atoms in the alkyl group and an aqueous solution of 10–70 weight percentage of hydrogen fluoride, are continuously introduced to a mixer having a capacity of mechanically milling the aluminum alcoholate into fine particles having a diameter below 500μ (500 microns), causing them to react by mixing at the temperature of 50–120° C., the reaction mixture being taken out continuously and transferred to the reaction completing receptacle where hydration and crystallization of aluminum fluoride are effected.

Here, the aluminum alcoholate having more than one alkoxyl group containing 4 to 20 carbon atoms in the alkyl group corresponds to what is called the aluminum alcoholate of a higher alcohol, which has alkoxyl group containing 4 to 20 carbon atoms in the alkyl group.

Said alkyl group can be of either normal chain structure or side chain structure. The aluminum alcoholate which contains an alkoxyl group consisting of said alkyl group is a compound which is expressed by either one of the following general formulas, when R, R′, R″ represent alkyl groups, H represents hydrogen atom, O represents oxygen atom and Al represents aluminum atom. By the way, it does not matter if R, R′, R″ are same or different.

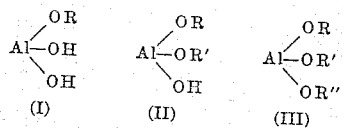

(I)    (II)    (III)

These aluminum alcoholates are either produced by the reaction of higher alcohols or their derivatives with aluminum or aluminum salts, with the object of refining the higher alcohol, or produced in great quantities by the petroleum chemical process which comprises oxidizing the products of telomerization reaction (the Ziegler process) of lower olefin catalized by aluminum hydride or trialkyl aluminum. Especially, the aluminum alcoholate produced by the Ziegler process is, in many cases, liable to coloring and also contains a large amount of hydrocarbons (aliphatic and aromatic), aldehydes and esters. But in the case of using the alcoholate as the manufacturing material for aluminum compounds containing fluorine, in accordance with the process of this invention, there is almost no bad effect on the reaction of this invention.

Although it is satisfactory if the aluminum alcoholate used in this invention is pure, even such an alcoholate as described above which contains a fairly large amount of impurities, or a hydrocarbon solution of aluminum alcoholate can be used conveniently in the process of this invention.

Now, regarding said aluminum alcoholate of higher alcohols, an explanation will be given hereunder taking the before-mentioned trialkoxyl aluminum (III) as an example. In general, an aluminum alcoholate having a simple structure of R=R′=″ is in solid state at room temperature, whereas the aluminum alcoholate formed by the petroleum chemical process in which, R, R′ and R″ are not equal usually, inasmuch as it is a mixture of various aluminum alcoholates having the structure (III) (and it contains a fairly large amount of impurities sometimes), is mostly in liquid state at room temperature and the solubility for its organic solvent is larger than that of pure aluminum alcoholate in which R=R′=R″.

The representative alkyl groups in the above formula are as follows: butyl group, amyl group, hexyl group, heptyl group, octyl group, nonyl group, decyl group, dodecyl group, undecyl group, tetradecyl group, hexadecyl group, octadecyl group, or eikocyl group, etc.

According to this invention, the hydrocarbon solution of aluminum alcoholate is useful, but the use of aluminum alcoholate from which olefinic impurities have been removed makes it easy to purify the higher alcohol and aluminum fluoride produced.

The aqueous solution containing 10–70 weight percentage of hydrogen fluoride is usually called fluoric acid or hydrofluoric acid, and is made up 10–70 weight percentage of pure HF and contains a small amount of impurities, such as sulfuric acid, fluosilicic acid, etc. The impurities consisting of these strong acids act to accelerate the reaction of the process of this invention, and therefore they are sometimes purposely added at low percentages. Hydrofluoric acid is a kind of economical acid produced by absorbing the gas formed by fluorite and sulfuric acid in water, or produced by dissolving anhydrous hydrogen fluoride produced by another process in water.

By the way, it is a matter of course that any grade of hydrofluoric acid, such that intended as for use as a reagent, for industrial use or for chemical use, can be employed for the process of this invention. But, in order to perform the reaction of aluminum alcoholate smoothly (at reaction temperature of 50–120° C.), it is suggested to use hydrofluoric acid containing more than 10% of hydrogen fluoride. However, with a concentrated hydrofluoric acid containing more than 70% of hydrogen fluoride, there results, as the reaction product, a fairly large amount of alkyl fluoride as a by-product, besides higher alcohols, especially, at above 80° C., which is not desirable.

In order to make the reaction proceed easily, it is desirable to use a hydrofluoric acid of 12–60 weight percent and react at 60–100° C. In the case of decomposing aluminum alcoholate by using an aqueous solution of acid aluminum fluoride (i.e. hydrofluoric acid solution of aluminum fluoride), it is desirable, in many cases, to effect such reaction at 60–100° C.

Aluminum alcoholate is not hydrophilic like other aluminium compounds, i.e. aluminum hydroxide, aluminum sulfate and aluminum chloride, etc., and is rather anti-hydrophilic. This is worthy of note when effecting reaction between aluminum alcoholate and hydrofluoric acid and it becomes very important industrially, to select the right reaction conditions and reaction device, because the yield of the desired product is dependent on the reaction conditions. The inventors have studied this point very carefully and finally arrived at the conclusion that the best results can be obtained by effecting reaction continuously little by little by putting aluminum alcoholate in a powerful mixer which is capable of milling it in a short time into fine particles having a diameter of below 500µ, preferably below 200µ. They have also discovered that a reaction temperature under 150° C., preferably 50–120° C. is most desirable.

Aluminum alcoholate is submitted to reaction as it stands or in solution in a hydrocarbon, and in order to divide said alcoholate into fine particles having diameter of below 500µ mean value, such devices as a colloid mill, a high speed rotating mixer and an ultra-sonic wave generating device, etc., may be used. From an industrial point of view, the devices belonging to the above mentioned two types are convenient as a powerul mixer. The completion of the reaction of aluminum alcoholate with the said acid solution is not easy because the higher alcohol and aluminum fluoride which are produced by the first reaction cover the surface of the alcoholate, thereby preventing the acid solution from penetrating into the interior of the alcoholate. And in order to accomplish the first object, it is necessary to perform rapidly and simultaneously both the fine milling and the primary reaction, under heated conditions, by means of powerful mixing.

As examples of powerful mixing devices there are the following: colloid mills (generally called emulsifiers, for example, Plauson mill, Premier mill, Hallel homogenizer, etc.), pony-mixers, angular-mixers, centrifugal-disk-type mixers, continuous type masticator, boundary mixers, etc. Even with the ordinary paddle type agitator, propeller type agitator or the mixer provided with turbine type agitator, it is possible to perform the reaction uniformly and completely if the number of rotations is more than 500 per minute, preferably 1500–15000 per minute. And, the emulsifying liquid, suspension mixture and slurry material which are obtained by the reaction of aluminum alcoholate using a powerful mixer as above mentioned with the aqueous solution containing hydrogenfluoride are transferred into the reaction completing receptacle for the completion of reaction and crystallization, and the reaction is completed after subjecting to stirring, steam blowing, heating and shaking, etc. A single reaction completing receptacle is enough, but, in order to make it easier to separate the reaction product resulting from the completion of the reaction and upon standing, several of them of, similar type or different type, may be used conveniently. Especially, in a reaction receptacle which has as its object to separate crystals and higher alcohols, it is more convenient if a cooler or a low-speed rotating stirrer is provided in order to make the formation of the hydrated crystal of aluminum fluoride complete and also make it easy to separate the higher alcohol. The fractional extraction of the oily liquid and the water layer containing hydrated crystals of aluminum fluoride which are separated in the reaction completing receptacle can be accomplished by means of the liquid separating method, the filtering method, the centrifugal separating method or by the combination of these methods. Now, an explanation will be given of the formation of aluminum fluoride crystals, in the case when the reaction mixture is centrifugally separated, as water and alcohol are separated from the crystalline product, and therefore the water and alcohol can be separated after standing. However, in the case when it is intended to obtain acid aluminum fluoride by the addition of excess hydrofluoric acid, it is possible to separate said acid aluminum fluoride from alcohol in a state of solution without crystallization, because the acid aluminum fluoride is stable only in an acid solution. Then the recovery of the alcohol is easy and the obtained higher alcohols need only be dehydrated and distilled after washing with water or alkaline solution.

The aluminum alcoholate and the aqueous solution of hydrogen fluoride are transferred to the powerful mixer from independent receptacles and flow out to the reaction completing receptacle after being subjected to the reaction treatment. The necessary time from their introduction to the powerful mixer to the flowing out is usually within an hour. A homogenizer of good efficiency can dispatch it within several minutes. However, even in such a case, it is desirable that the reaction temperature is maintained at 50–120° C. The time necessary for the completion of reaction in the reaction completing receptacle is approximately 1–50 hours, although it differs according to scale, and also the reaction temperature is between 0–120° C. However, a low temperature should be avoided in case of solidification of the produced higher alcohols in the aqueous state, and for this reason, a temperature of 10–90° C. is suitable for the purpose.

In precipitating out the crystals of aluminum fluoride hydrate efficiently, however, it is necessary to pay attention to a few things as follows. There are two types of the crystal of aluminum fluoride hydrate, i.e. the water soluble crystal and the slightly soluble crystal. The soluble hydrated crystal is obtained in the case when the reaction and the crystal precipitation is effected at a temperature below 50° C. while in the neighborhood of 100° C. the slightly soluble hydrated crystal is obtained. In general, the crystals of aluminum fluoride hydrate obtained at reacting and crystal forming temperatures of 30–90° C. are a mixture of the soluble and slightly soluble crystals, and the higher alcohol is present in the reaction system, there is a greater tendency toward formation of the more soluble crystal than if it is not present. The formation of this soluble hydrated crystal in a great quantity results in degeneration of the yield of aluminum fluoride, and therefore, it is necessary to effect the completion of reaction, if possible, at a temperature about 50° C., thereby changing the structure of the hydrated crystal of aluminum fluoride from the soluble type to the slightly soluble type.

Although various methods, such as the filtering method, centrifugal separating method, compressing method, etc. can be utilized in the separation of the crystals of aluminum fluoride hydrate, it is most convenient to perform centrifugal separation continuously, and also desirable to maintain the temperature at below 50° C. during the separation period, in order to improve the yield of the alcohol and aluminum fluoride. The crystal of aluminum fluoride hydrate obtained by means of this separation contains water as an impurity as well as the higher alcohols. When calcination according to the well known method is performed without removing these beforehand, it happens that the impurities higher alcohols will partially turn into aldehydes through oxidation or into olefins through decomposition so that the aluminum fluoride will turn to a gray or dark colour due to the presence of carbonized materials. Highly pure anhydrous aluminum fluoride can be obtained by de-alcoholizing the crystals of aluminum fluoride hydrate and subsequently drying followed by calcination.

Next, hereunder, an explanation will be given of the decomposition reaction of aluminum alcoholate by hydrofluoric acid. If the aluminum alcoholate of a higher alcohol is represented by $Al(OR)_3$, the reaction with hydrofluoric acid is generally expressed as follows:

(1) Formation of aluminum fluoride:
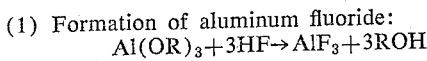
$$Al(OR)_3 + 3HF \rightarrow AlF_3 + 3ROH$$

(2) Formation of acid aluminum fluoride:
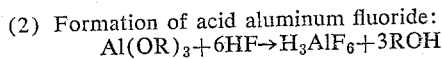
$$Al(OR)_3 + 6HF \rightarrow H_3AlF_6 + 3ROH$$

Water is necessary as the solvent for these reactions. The water acts as the reaction solvent and combines with aluminum fluoride as the crystallization water after the production of aluminum fluoride, and also is placed as the solvent of acid aluminum fluoride. Although the above reaction is extremely rapid on a laboratory or small scale, when conducting operations on a commercial or large scale several hours are required for completion of the reaction.

In the case of using trialkoxy-aluminum, the raw material, as aluminum alcoholate, the calculated amount of pure hydrogen fluoride necessary for producing $AlF_3$ from $(C_nH_{2n+1}O)_3Al$ is obtained by the following equation: (wherein $n$ represents the carbon number in the alkyl group)

$$HF_{gr} = (C_nH_{2n+1}O)_3Al_{gr} \times \left(\frac{10}{7n+13}\right)$$

For example, in the case of aluminum octylate, $n=8$, the hydrogen fluoride which is necessary to produce $AlF_3$ for 1000 g. of aluminum octylate is 145 g., in other words, 290 g. of 50% hydrofluoric acid is needed. However, actually, in order to precipitate the crystals of aluminum fluoride hydrate which are beautiful or easy to dealcoholize to improve the purity, it is recommended to use more hydrofluoric acid than the calculated amount. But the use of hydrofluoric acid in a large excess decreases the yield of aluminum fluoride and gives rise to the increase of acid aluminum fluoride.

As described above, the inventors have discovered a new process for producing aluminum fluoride. Hereinafter, some of the representative experiments are selected and are given in order to make the subject matter and the significance of this invention clear. Of course, the process of the present invention is not to be limited only to these examples, but changes and modifications may be made properly without departing from the spirit of this invention. The superiority and novel features of this invention are made clearer by the following examples.

*Example 1*

10 kg. of aluminum octylate which was heated and melted and 6 kg. of 25% hydrofluoric acid were conducted from the storing tanks by different pipes to the inlet of a homogenizer. Said homogenizer fitted with a steam jacket was heated at 70% C. beforehand and was in operation at 6,000 revolutions per minute. The distance between the rotary surface of the homogenizer and the fixed surface was adjusted to 0.001 inch. In proportions of approximately 5:3 in weight, alcoholate and hydrofluoric acid were added for thirty minutes. The emulsifying liquid was introduced from the outlet of the homogenizer to the reaction completing receptacle made of polyethylene and was installed underneath of the homogenizer, where it was further mixed with 10 kg. of hot water and stirred for 24 hours and then cooled. Octyl alcohol was separated in the upper layer and a great quantity of beautiful crystal of aluminum fluoride hydrate was precipitated in the aqueous solution. Both octyl alcohol and aluminum fluoride were produced as finished products after having been refined and dehydrated, separately. The yield for each was 93–95%.

*Example 2*

In the process of Example 1, 12 kg. of 25% hydrofluoric acid was used and processed in the similar way. The mixture obtained in the reaction completing receptacle was separated, by fractional extraction, into octyl alcohol and the water solution of acid aluminum fluoride after cooling. Next, the solution of acidic aluminum fluoride was neutralized (it is suggested to use the homogenizer for this neutralization) by sodium carbonate and the precipitation of cryolite was obtained, which was filtered and dried and then calcined. The yield of cryolite was 96%.

*Example 3*

The aqueous solution of acid aluminum fluoride which had been separated in Example 2 was preserved and used in place of 25% hydrofluoric acid in the process of Example 1. In this case, the homogenizer was maintained at 50% C. and operated at the rotating speed of 8,000 revolutions per minute. As the result of operation which was similar to that in Example 1, 90% of yield of octyl alcohol was obtained, the yield of aluminum fluoride was 92% based on aluminum.

*Example 4*

The alcoholate obtained by oxidizing trialkyl aluminum produced from ethylene and aluminum hydride by means of the Ziegler process has the following composition. A representative example showed that the composition of the alcohol constituting the aluminum alcoholate was analysed as follows:

| | Mol percent |
|---|---|
| Hexyl alcohol | 12 |
| Octyl alcohol | 19 |
| Decyl alcohol | 23 |
| Dodecyl alcohol | 20 |
| Tetradecyl alcohol | 14 |
| Cetyl alcohol | 8 |
| Stearyl alcohol | 4 |

The mixture of 200 g. of toluene solution containing 5% of aluminum alcoholate which is given by a mean composition formula $(C_{11}H_{23}O)_3Al$, 15 g. of 15% hydrofluoric acid and 0.1 g. of sulfuric acid was introduced to a small size emulsifier at 60–70% C., and the resultant solution was transferred to the receiving receptacle immediately, where it was neutralized with dilute ammonia solution using methylorange as an indicator while stirring said mixed solution and then cooled, thereby resulting in the precipitation of crystals of aluminum fluoride hydrate, which were filtered, dehydrated and dried to obtain crystals of anhydrous aluminum fluoride. In this case, even if petroleum fraction (naphtha) was used, in place of toluene, as a solvent of aluminum alcoholate, that distillating temperature limit was 70–120° C., it was possible to obtain anhydrous aluminum fluoride by means of the above operation at a yield of 85–88%.

*Example 5*

In the process of Example 4, pure crystalline tris-undecyloxy aluminum was used in place of the mixed alcoholate. Tris-undecyloxy aluminum was dissolved in benzene or toluene and subjected to the same treatment as in Example 4, and aluminum fluoride was obtained at a yield of 93%.

*Example 6*

Aluminum alcoholate which corresponds to the mean composition $(C_{11}H_{23}O)_3Al$ obtained by oxidizing trialkyl aluminum produced by ethylene and aluminum hydride as shown in Example 4, is in a liquid state itself even at room temperature. It was maintained at 70° C., and 30% hydrofluoric acid was maintained at 70° C. in order to accelerate reaction, approximately 1% in weight of hydrochloric acid or fluosilicic acid having been added. 1,000 g. of the aluminum alcoholate and 400 g. hydrofluoric acid were sent in, from independent storing vessels, to a homogenizer for manufacturing emulsion, in 15 minutes, said homogenizer having been heated with steam. The reaction liquid which was mixed sufficiently by means of the homogenizer was sent into the reaction completing receptacle and kept standing for one night at room temperature. The higher alcohol separated was recovered and the residue was separated centrifugally. The separated crystals of aluminum fluoride hydrate were treated with ethanol at 70° C. and after removing higher alcohols, they were put into a drying oven and preserved there for one hour under a drying hot air of 100–200° C. Next after subjecting the crystals to dehydration in a calcinating oven at 400–500° C. for 3 hours, aluminum fluoride having 94% purity was obtained at a yield of 92%. The total recovery rate of higher alcohols was 95%.

Example 7

A stainless steel juice mixer was fitted with a bent pipe of stainless steel to serve as a siphon, the end of said pipe being conducted to a filtering flask of stainless steel, which was kept at diminished pressure by means of an aspirator, and the reaction was conducted at the room temperature of 29–30° C. 1,000 g. of liquid aluminum alcohol obtained by means of the Ziegler process and having mean composition corresponding to $(C_{11}H_{23}O)_3Al$ and 1,000 g. of 12% hydrofluoric acid were fed at the same speed in 20 minutes. The mixed solution resulting from the rotation of the mixer was sent successively into the filtering flask by means of the stainless steel pipe, said filtering flask serving as a reaction completing receptacle. About 40 minutes was needed for this procedure. Finally, the residue in the mixer was taken into the filtering flask and stirred at 100° C. for 5 hours and then cooled. The reaction mixture was separated into alcohol and crystals, the crystals were washed with ethanol and then dried and calcined. The yield of aluminum fluoride was 90%.

Example 8

1,000 g. of tris-decyloxy aluminum and the solution of 700 g. of 20% hydrofluoric acid with 50 g. of hydrochloric acid were subjected to mixing and reaction in a small type emulsifier at a temperature of 70–80° C. The resultant mixture was sent into the reaction completing receptacle immediately and stirred gently for 7 hours at 60–70° C. The precipitated crystals of aluminum fluoride hydrate were filtered and washed with ethanol, and then calcined to obtain anhydrous aluminum fluoride in 89% yield.

Example 9

1,000 g. of melted tris-butyloxy aluminum and 500 g. of 50% hydrofluoric acid were passed through a homogenizer maintained at 80–90° C., the resultant emulsion was put into the receiving receptacle, then mixed with about 500 g. of hot water and after 3 hours stirring at 70–90° C., it was cooled and kept standing, thus obtaining precipitation of beautiful crystals of aluminum fluoride hydrate. After dehydration by means of a centrifugal separator and calcinating, anhydrous aluminum fluoride was obtained at a yield of 90%.

Example 10

300 g. of crude lauryl alcohol which was obtained through fractional distillation of coconut oil's reducing alcohol, was mixed with 10 g. of metal aluminum pieces and 0.5 g. of mercuric chloride and the mixture was heated on a steam bath. Then the reaction became violent, generating hydrogen, and after 4 hours the aluminum pieces were dissolved almost completely. The reaction mixture was distilled under a diminished pressure, thereby removing about 30 g. of oily liquid, the residue and the solution of 75 g. of 40% industrial hydrofluoric acid containing 2% fluosilicic acid were sent into the emulsifier at 70–80° C. The flowing-out emulsion was transferred into the reaction completing receptacle and kept standing for 5 hours at 60° C. By distillation of the mixture, 250 g. of lauryl alcohol and crystals of aluminum fluoride hydrate were obtained. The hydrated crystals was calcined to obtain 28 g. of anhydrous aluminum fluoride.

Example 11

In the process of Example 10, 400 g. of crude cetyl alcohol which was obtained from whale oil was employed in place of crude lauryl alcohol. The same result was obtained by the operation of the homogenizer.

Example 12

In the process of Example 10, the same result could be obtained by using 440 g. of crude stearyl alcohol in place of crude lauryl alcohol.

Example 13

2,500 g. of alcoholate mixture produced by the oxidation of trialkyl aluminum, whose mean composition is near to $(C_{12}H_{25}O)_3Al$ and 1,800 g. of 22% hydrofluoric acid were sent into a homogenizer for making emulsion, taking 30 minutes. The slurry flowing-out of the homogenizer was conducted continuously into a receiving receptacle made of lead. The reaction temperature was 60–65° C. The reaction mixture was then subjected to stirring for 4 hours while blowing-in steam and then cooled. The resultant crystals were separated by means of centrifugal separation and after being washed with hot water, the crystals were dehydrated and put in a drying oven to produce anhydrous aluminum fluoride. The yield of aluminum fluoride was 87%.

Example 14

In the process of Example 13, the same result could be obtained by using 2,500 g. of alcoholate mixture which was produced by the oxidation of trialkyl aluminum, whose mean composition is approximately $$(C_{11.5}H_{24}O)_3Al$$

Example 15

In the process of Example 14, 2,500 g. of alcoholate mixture produced by the oxidation of trialkyl aluminum, whose mean composition is near to $(C_{18}H_{37}O)_3Al$ was subjected to reaction with 600 g. of 30% hydrofluoric acid, and the resultant slurry flowing-out of the homogenizer was continuously conducted into the receiving receptacle. The mixture was treated with steam to complete the reaction and cooled and the oily layer was extracted and distilled. The aqueous layer was bubbled with steam to remove the unchanged hydrofluoric acid and then cooled. The crystals of aluminum fluoride hydrate settled out. After the separation and calcination of the hydrated crystals, anhydrous aluminum fluoride was obtained at a yield of 95%.

What we claim is:

1. A process for producing aluminum fluoride from an aluminum alcoholate which comprises introducing continuously into a mixer an aluminum alcoholate containing at least one alkoxy group having 4 to 20 carbon atoms and an aqueous solution containing from 10% to 70% by weight of hydrogen fluoride, milling the said aluminum alcoholate in the mixer to fine particles having a diameter below 500μ, and mixing the aluminum alcoholate particles and the said aqueous solution containing hydrogen fluoride at a temperature in the range of 50° C to 120° C., thereby causing the aluminum alcoholate and hydrofluoric acid to react, and thereafter transferring the reaction mixture to a reaction completing zone and allowing the reaction to proceed to completion over a period of at least three hours and separating the aluminum fluoride produced.

2. A process according to claim 1 in which the aluminum alcoholate is an aluminum derivative of an alkanol selected from the group consisting of butyl, hexyl, octyl, decyl, undecyl, dodecyl, tetradecyl, hexadecyl and octadecyl alcohols.

3. A process according to claim 1 which comprises separating the aluminum fluoride as aluminum fluoride hydrate crystals.

4. A process according to claim 1 which includes adding an excess of hydrogen fluoride and separating the aluminum fluoride as an acidic aluminum fluoride solution.

5. A process according to claim 1 in which the aluminum alcoholate is in solution in a hydrocarbon solvent.

6. A process according to claim 1 in which the said aqueous solution is a hydrofluoric acid solution containing a small percentage of an inorganic strong acid.

7. A process according to claim 1 in which the aluminum alcoholate is a trialkoxy aluminum containing at least one alkoxy group having 4 to 20 carbon atoms.

8. A process according to claim 7 in which the trialkoxy aluminum is an oxidation product of a mixture of higher trialkyl aluminums.

9. A process according to claim 7 in which the trialkoxy aluminum is a derivative of a product selected from the group consisting of whale oil and coconut oil.

10. A process according to claim 7 in which the trialkoxy aluminum is in solution in a hydrocarbon solvent.

References Cited by the Examiner
UNITED STATES PATENTS

| | | | |
|---|---|---|---|
| 1,851,475 | 3/1932 | Zimmermann | 23—88 |
| 2,903,418 | 9/1959 | Kirshenbaum et al. | 23—143 X |
| 2,991,256 | 7/1961 | Hauel et al. | 23—143 X |

OSCAR R. VERTIZ, *Primary Examiner.*

BENJAMIN HENKIN, MILTON WEISSMAN, *Examiners.*

E. STERN, *Assistant Examiner.*